Patented Feb. 15, 1949

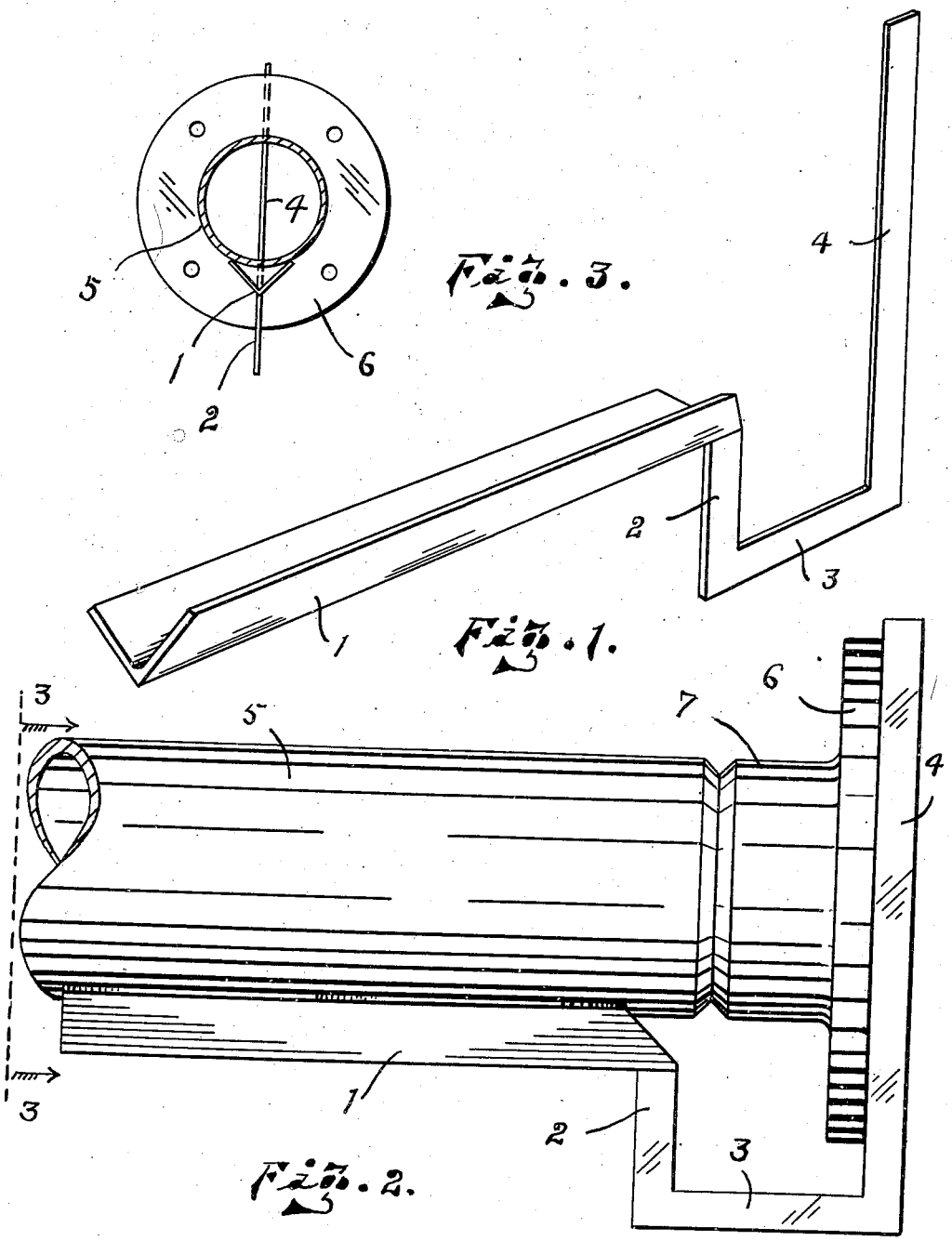

2,461,783

UNITED STATES PATENT OFFICE 2,461,783

GAUGE FOR COLLOCATING PIPE SECTIONS

Charles John Stark, Duluth, Minn.

Application February 16, 1948, Serial No. 8,499

1 Claim. (Cl. 33—180)

This invention relates to a square-like gauge especially adapted for use in proper placing of flanged connections on pipe so that the said flanges may be welded on perpendicularly disposed to the axis of said pipe, the particular type of pipe being large water, steam and gas pipes which are usually difficult to handle.

One of the principal objects of the invention is to provide a device which is simple and accurate to use and very inexpensive to manufacture.

Other objects and advantages will appear as the description of the invention proceeds.

In the accompanying drawing forming a part of this application:

Fig. 1 is a perspective view of one of the improved squaring devices.

Fig. 2 is an enlarged side elevational view of one terminal portion of a pipe with a bossed flange positioned for welding thereto, the square being employed to position same.

Fig. 3 is a reduced elevational view on the line 3—3, Fig. 2.

The common instrument known as a mechanic's square is well known to have major and minor body portions perpendicular to each other and of an integral piece of flat metal. In similar respects are the principal elements of the instant invention except that the major body portion 1 of the latter is of trough-like form or V-shape in cross section throughout terminating at one, or the head, end in the right angularly extending flat blade portion 2 of the head.

This extension, obviously, must be of sufficient length to accommodate the largest diameter of flanges to be gauged or set, as clearly illustrated in the drawing. A stepped extension 3 of a length to readily accommodate the thicker flanges as shown in Fig. 2 is provided and extends from the outer end of the portion 2. Attached to or integral with the extension 3 and disposed at a right angle to the body portion 1 is the ultimate gauging blade portion 4 of the instrument by which a flange may readily be set at exactly right angles to the axis of a pipe or other circular object.

The operation of the device is clearly illustrated in the drawing which shows a V-shaped body portion 1 abutting the outer wall of a pipe and the gauging blade 4 abutting the flat outer surface of the flange across the diameter thereof to insure the face of the flange being perpendicular to the pipe, the members or extensions 2 and 3 serving to space the blade 4 from the body 1 far enough to permit the flange's being installed without interference from the squaring device.

With the device held as shown in Fig. 2, a welder may readily "tack" the flange in place for subsequent complete welding and the squaring device may be slid around the outside of the pipe to check the squareness of the flange in any and all diametrical positions.

The mode of employing the instant gauge is that a flange is held against the end of the pipe to which it is to be welded, and in alinement therewith. This holding of the flange against the end of the pipe will readily disclose to the skilled artisan where the high spot on the pipe end is. Applicant's square may be employed to find the high spot in case of doubt, however, the skilled artisan will be able to detect same without a square as a general rule. (There is invariably one spot which is higher than the others due to the fact that a pipe cannot be cut off perfectly square under practical working conditions.) The flange boss and the pipe are "tacked" together by welding at this high spot. The gauge is then brought into play to square the flange diametrically across the pipe from the "tacked" point, and the pipe and flange boss are again "tacked" together at the point substantially diametrically opposite the first "tack." The gauge is then slid around the periphery of the pipe to a position substantially normal to its original gauging position to square the flange from that point when a third "tack" is made. These three "tacks" are sufficient to aline the flange properly on the pipe and the welding completely around the periphery of the connection may be begun. If desired, the flange may be checked for squareness from various positions but such is not essential when a skilled artisan is at work.

The pipe to which the flange is applied is indicated at 5, the flange at 6, and the boss of the flange is indicated at 7.

It is deemed quite obvious that the trough shaped elongated body portion of the novel instrument insures accurate and most convenient setting of pipe flanges as against the common method practiced.

Furthermore, it is apparent that while the device is designed for use on pipe, the same may be employed for other means as well without departing from the spirit of the invention.

Having thus described my invention, what I claim is:

A device for use in squaring flanges as they are applied to pipes comprising a V-shaped body portion adapted to engage the outer wall of said pipe, a gauging blade spaced from said body portion and disposed at a right angle thereto, and a substantially L-shaped extension fixed to one end of said body portion and at the other end to one end of said blade to hold said blade in said spaced relation with portions thereof extending beyond said body portion on opposite sides thereof, said body portion, blade, and extension being unitary.

CHARLES JOHN STARK.

REFERENCES CITED

The following references are of record in the file of this patent:

UNITED STATES PATENTS

| Number | Name | Date |
|---|---|---|
| 76,123 | Wells | Mar. 31, 1868 |
| 403,740 | Culver | May 21, 1889 |
| 464,290 | Taylor | Dec. 1, 1891 |
| 486,042 | Holland | Nov. 8, 1892 |
| 809,562 | Gumpp | Jan. 9, 1906 |
| 1,174,009 | Hjorth | Feb. 29, 1916 |
| 1,848,527 | Hickey | Mar. 8, 1932 |
| 1,940,910 | Hickey | Dec. 26, 1933 |
| 1,997,758 | Tiefenbacher | Apr. 16, 1935 |